United States Patent
Ridgway

(10) Patent No.: US 7,334,817 B2
(45) Date of Patent: Feb. 26, 2008

(54) ACTIVE ENERGY ABSORPTION METHOD USING TILT AND TELESCOPE POSITIONS

(75) Inventor: Jason R. Ridgway, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 412 days.

(21) Appl. No.: 10/932,833

(22) Filed: Sep. 2, 2004

(65) Prior Publication Data

US 2006/0043721 A1 Mar. 2, 2006

(51) Int. Cl.
*B62D 1/00* (2006.01)
(52) U.S. Cl. .......................... 280/777; 74/492; 74/493
(58) Field of Classification Search ................ 280/775, 280/777; 74/492, 493, 495
See application file for complete search history.

(56) References Cited

U.S. PATENT DOCUMENTS

| | | | |
|---|---|---|---|
| 4,850,239 A | 7/1989 | Oosterwal | |
| 4,886,295 A | 12/1989 | Browne | |
| 4,970,910 A | 11/1990 | Cymbal | |
| 5,131,286 A | 7/1992 | Sturges et al. | |
| 5,193,848 A | 3/1993 | Faulstroh | |
| 5,524,927 A | 6/1996 | Toussaint | |
| 5,593,183 A | 1/1997 | Fouquet et al. | |
| 5,595,399 A | 1/1997 | Fouquet et al. | |
| 5,673,937 A | 10/1997 | Fevre et al. | |
| 5,692,778 A | 12/1997 | Cymbal | |
| 5,802,926 A | 9/1998 | Thomas | |

(Continued)

FOREIGN PATENT DOCUMENTS

| | | |
|---|---|---|
| EP | 1060974 | 12/2000 |
| EP | 1550599 | 7/2005 |

*Primary Examiner*—Eric Culbreth
*Assistant Examiner*—Toan C. To
(74) *Attorney, Agent, or Firm*—Michael D. Smith

(57) ABSTRACT

The invention provides a method and apparatus that improves the adjustment of energy absorbing properties of the steering column of a vehicle. The method includes the step of disposing a first steering column member for axial movement along an extension path between an extended position and a retracted position relative to a second steering column member. The first steering column member is also disposed for pivoting movement along a pivot path between a tilt-up position and a tilt-down position relative to the second steering column member. The method includes the step of absorbing energy associated with relative movement between first and second steering column members along the extension path at a first rate with a first device. The first device can be any type of energy absorbing arrangement known in the art, such as an arrangement including a strap and an anvil. The method includes the step of adjusting the first rate of energy absorbed during said absorbing step with a second device. The second device adjusts the first device in response to at least one of a position of the first steering column member along the extension path and a position of the first steering column member along the pivot path. The rate of energy absorption is thus reflective of the extension of the first steering column member or the tilt position of the first steering column member. In one embodiment of the invention, the second device can adjust the first device in response to both of the extension of the first steering column member and the tilt position of the first steering column member.

11 Claims, 2 Drawing Sheets

U.S. PATENT DOCUMENTS

| | | |
|---|---|---|
| 5,899,116 A | 5/1999 | Armstrong et al. |
| 6,170,874 B1 | 1/2001 | Fosse |
| 6,189,929 B1 | 2/2001 | Struble et al. |
| 6,264,239 B1 | 7/2001 | Link |
| 6,322,103 B1 | 11/2001 | Li et al. |
| 6,394,241 B1 | 5/2002 | Desjardins et al. |
| 6,443,491 B1 | 9/2002 | Fukunaga |
| 6,454,302 B1 | 9/2002 | Li et al. |
| 6,574,540 B2 | 6/2003 | Yokota et al. |
| 6,631,924 B2 | 10/2003 | Nomura et al. |
| 6,641,167 B2 | 11/2003 | Riefe et al. |
| 6,652,002 B2 | 11/2003 | Li et al. |
| 6,726,248 B2 | 4/2004 | Satou et al. |
| 6,749,221 B2 | 6/2004 | Li |
| 6,769,715 B2 * | 8/2004 | Riefe et al. .................. 280/777 |
| 6,916,044 B2 * | 7/2005 | Bannon ....................... 280/777 |
| 2005/0006890 A1 * | 1/2005 | Bannon ....................... 280/777 |
| 2005/0258627 A1 * | 11/2005 | Sadakata et al. ............. 280/775 |
| 2005/0285383 A1 * | 12/2005 | Yae et al. .................... 280/777 |
| 2006/0033321 A1 * | 2/2006 | Manwaring et al. ......... 280/777 |
| 2006/0049621 A1 * | 3/2006 | Lee ............................ 280/777 |

* cited by examiner

ACTIVE ENERGY ABSORPTION METHOD USING TILT AND TELESCOPE POSITIONS

FIELD OF THE INVENTION

The invention relates to an adjustable energy absorbing system for a steering column of a vehicle.

BACKGROUND OF THE INVENTION

Steering column assemblies for vehicles often include kinetic energy absorption/dissipation devices that control the collapse of the column in the event of a crash to reduce the likelihood of injury to the driver. One form of an energy absorbing device comprises a metal strap that is bent and drawn over an anvil to absorb kinetic energy of a collapsing column. Examples of this type of energy absorbing device include U.S. Pat. Nos. 6,170,874; 6,189,929; 6,322,103; and 6,652,002. The rate of energy dissipation can be adjusted, as shown in U.S. Pat. Nos. 6,749,221; 6,652,002; and 6,641,167. The adjustment of the rate of energy absorbed/dissipated can be made in response to speed of the vehicle and the mass of the driver.

SUMMARY OF THE INVENTION AND ADVANTAGES

The invention provides a method and apparatus that improves the adjustment of energy absorbing properties of the steering column of a vehicle. The method includes the step of disposing a first steering column member for axial movement along an extension path between an extended position and a retracted position relative to a second steering column member. The first steering column member is also disposed for pivoting movement along a pivot path between a tilt-up position and a tilt-down position relative to the second steering column member. The method includes the step of absorbing energy associated with relative movement between first and second steering column members along the extension path at a first rate with a first device. The first device can be any type of energy absorbing arrangement known in the art, such as an arrangement including a strap and an anvil. The method includes the step of adjusting the first rate of energy absorbed during said absorbing step with a second device. The second device adjusts the first device in response to at least one of a position of the first steering column member along the extension path and a position of the first steering column member along the pivot path. The rate of energy absorption is thus reflective of the extension of the first steering column member or the tilt position of the first steering column member. In one embodiment of the invention, the second device can adjust the first device in response to both of the extension of the first steering column member and the tilt position of the first steering column member.

The invention improves the adjustment of energy absorbing properties of the steering column of a vehicle. For example, the forces acting on the steering column during collapse are different when the impacting force is centered along the axis of the steering column than when the impacting force is offset with respect to the axis of the steering column. The invention contemplates the differences and adjusts the energy absorbing properties of the steering column accordingly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
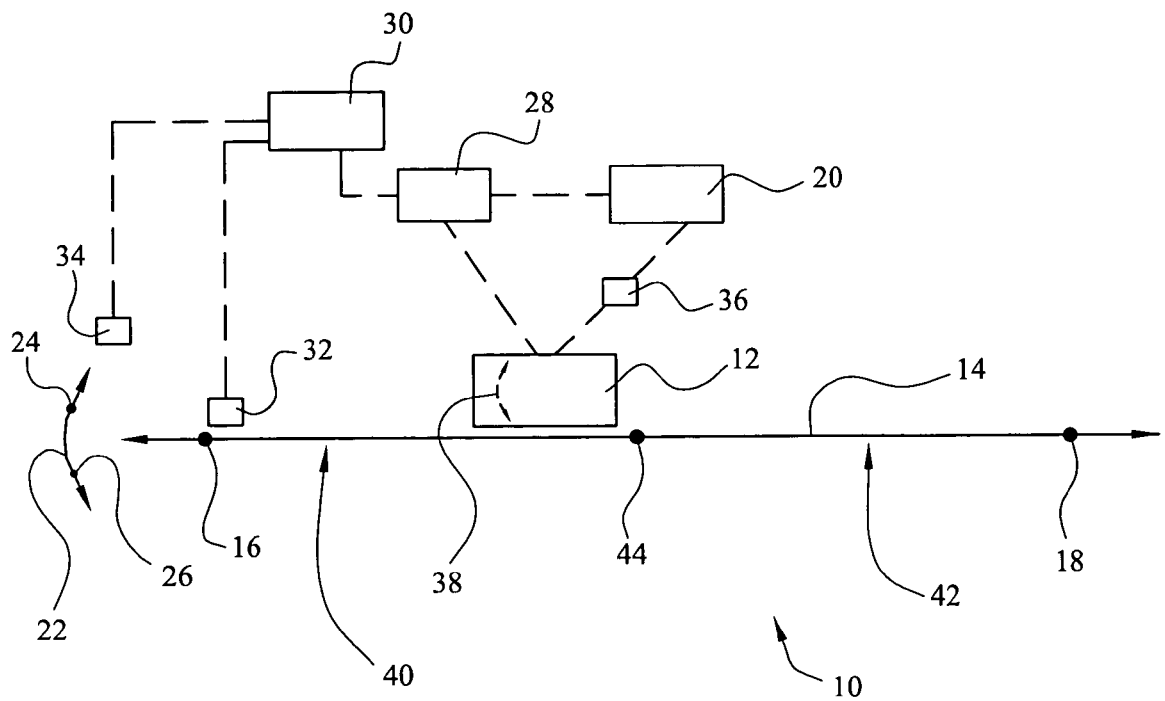
FIG. 1 is a schematic view of an exemplary embodiment of the invention.

Referring now to FIG. 1, the invention provides a method and apparatus that improves the adjustment of energy absorbing properties of the steering column of a vehicle. The apparatus includes a first steering column member 12 coupled to a second steering column member 20 by a guide assembly 36 that allows telescope and tilt adjustment of the first steering column member. The method includes the step of disposing the first steering column member 12 for axial movement along an extension path 14 between an extended position 16 and a retracted position 18 relative to the second steering column member 20. The first steering column member 12 is also disposed for pivoting movement along a pivot path 22 between a tilt-up position 24 and a tilt-down position 26 relative to the second steering column member 20. The method includes the step of absorbing energy associated with relative movement between first and second steering column members 12, 20 along the extension path 14 at a first rate with a first device 28. The first device 28 can be any type of energy absorbing arrangement known in the art, such as an arrangement including a strap and an anvil. The method includes the step of adjusting the first rate of energy absorbed during said absorbing step with a second device 30, which is a controller. The second device adjusts the first device 28 in response to at least one of a position of the first steering column member 12 along the extension path 14, as determined by a sensor 32, and a position of the first steering column member 12 along the pivot path 22, as determined by a sensor 34. The rate of energy absorption is thus reflective of the extension of the first steering column member 12 or the tilt postion of the first steering column member 12. In one embodiment of the invention, the second device 30 can adjust the first device 28 in response to both of the extension of the first steering column member 12 and the tilt position of the first steering column member 12.

The first steering column member 12 can be any steering column member moveable axially and pivotally, such as a tilt housing in combination with an upper jacket, a combination of the tilt housing and the upper jacket and a lower jacket, or a combination of upper and lower jackets. The second steering column member 20 can be any steering column member such as bracket that is fixedly associated with the vehicle and a lower jacket.

The first and second steering column members 12, 20 move relative to one another when the column collapses in response to an impacting force. Collapsing movement is axial/straight and is generally along a center or longitudinal axis of the entire steering column assembly. In one example, the first steering column member 12 could be a tilt housing in combination with an upper jacket and the second steering column member 20 could be a bracket fixedly associated with the vehicle. The tilt housing would be associated with an upper jacket, being operable to pivot relative to the upper jacket and moveable along the extension path 14 relative to the bracket. In another example, the first steering column member 12 is the combined tilt housing and upper jacket and lower jacket and the second steering column member 20 is a bracket that connects the combined tilt housing and upper jacket and lower jacket to the vehicle. During adjustment, the combined tilt housing and upper jacket and lower jacket may move relative to one another to adjust the position of the steering wheel. At least one of the tilt housing and upper jacket and lower jacket moves relative to the bracket during adjustment. In alternative embodiments of the invention, a lock can be disposed between the first and second steering column members 12, 20 to selectively lock the combined tilt housing and upper jacket and lower jacket with respect to one another. During collapse, the combined tilt housing and upper jacket and lower jacket are, generally, locked with respect to one another and move in unison along the extension path 14 with respect to the bracket. The bracket could be releasibly associated with either of the upper and lower jackets, for example, by a capsule. In another example, the first steering column member 12 could be an upper jacket and the second steering column member could be a lower jacket. The jackets may not pivot relative to one another, but may move along the pivot path 22 in unison.

FIG. 1 shows that the extension path 14 moves with the first steering column member 12 along the pivot path 22. In alternative embodiments of the invention, the extension path 14 can be fixed with respect to the vehicle and the first steering column member 12 could be moveable about an alternative pivot path 38.

The extension path 14 includes a first portion 40 corresponding to a range of available telescopic adjustment controlled by the driver. The first portion 40 includes the extended position 16. The extension path 14 also includes a second portion 42 corresponding to telescopic collapse of the first steering column member 12. The second portion 42 includes the retracted position 18. An intermediate position 44 is disposed along the extension path 14 between the extended and retracted positions 16, 18. The intermediate position 44 corresponds to maximum retraction of the first steering column member 12 over the first portion 40. In other words, the intermediate position 44 corresponds to the driver adjusting the first steering column member 12 to be as retracted as allowable within the range of available telescopic adjustment controlled by the driver. The first steering column member 12 can move along both first and second portions 40, 42 of the extension path 14. For example, if the first steering column member 12 is disposed at the intermediate position 44 and a collapsing force is applied to the first steering column member 12, the first steering column member 12 can move from the intermediate position 44 towards the retracted position 18 along the extension path 14.

Energy is absorbed in response to relative movement between first and second steering column members 12, 20 along the extension path 14 at a first rate by the first device 28. Energy is absorbed as the first steering column member 12 moves relative to the second steering column member 20 along the extension path 14 at least until the first steering column member 12 reaches the retracted position 14. In some embodiments of the invention, the first steering column member 12 can be prevented from moving past the retracted position 18. The rate of energy absorbed in response to movement can be varied. The first device 28 can be any energy-absorbing steering column system known in the art, including systems having a strap and an anvil. In such systems, adjustment can be accomplished by adjusting the configuration of the strap or of the anvil. The first device 28 can be adjusted using any known method and apparatus of energy absorption including U.S. Pat. Nos. 6,749,221; 6,652,002; and 6,641,167, which are hereby incorporated by reference in their entireties.

Figure 2:
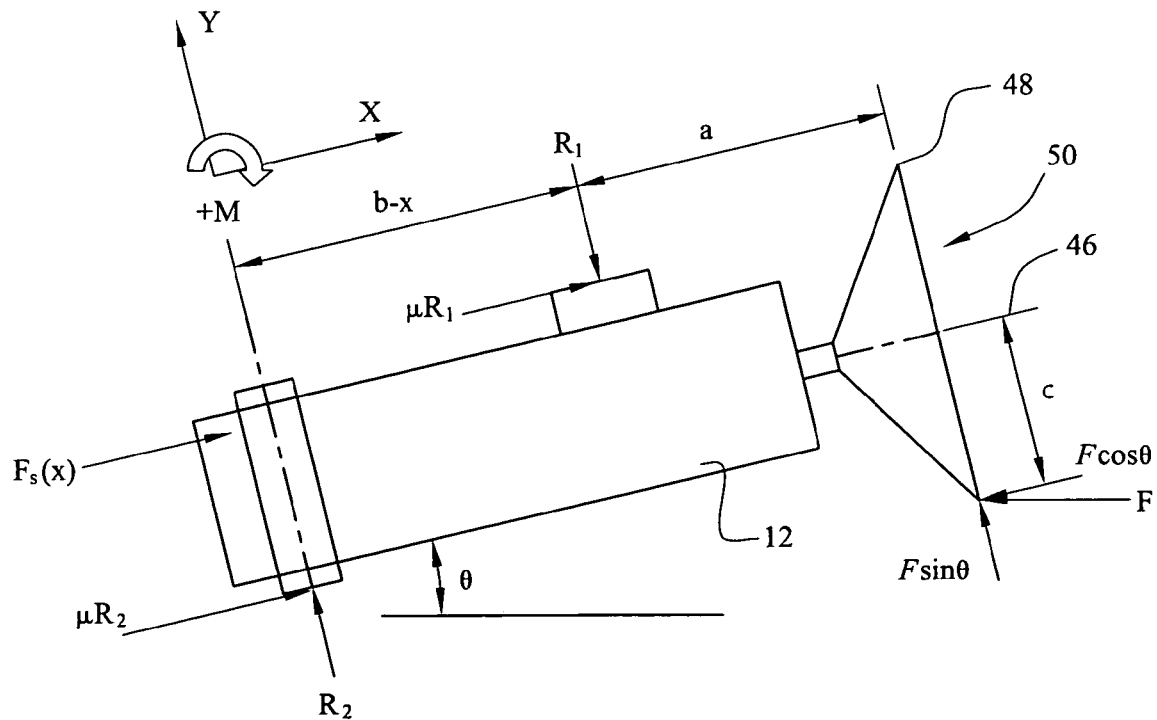
FIG. 2 is a second schematic view showing forces acting on a first steering column member of the exemplary embodiment of the invention.

Referring now additionally to FIG. 2, the collapse of the first steering column member 12 occurs in response to an impacting force F applied the first steering column member 12. The impacting force F can be coaxial with a longitudinal axis 46 of the column or applied offset with respect to the longitudinal axis 46 of the first steering column member 12. When the collapsing force F is applied offset with respect to the longitudinal axis of the column, such as on a rim 48 of a steering wheel 50, additional forces can be generated, such as frictional forces.

FIG. 2 is a free body diagram helpful in analyzing the steering column system, which includes the first and second steering column members 12, 20, in order to derive an equation that represents the force on the driver for a given column angle and collapse distance. In the schematic free body diagram of FIG. 2, the second steering column member 20 is not shown. The second steering column member would be disposed proximate to the position of reaction force $R_1$, discussed in greater detail below. One of the assumptions made in the calculations associated with the free body diagram is that the height of the column in the Y-direction is neglected. This means that all of the forces included in the free body diagram are in contact with the longitudinal axis 46 of the steering shaft (X-axis), even though the free body diagram displays these forces at different distances away from this axis 46. Other assumptions made in this section include: the entire column is a perfect rigid body/no deflection; the column equation is static, not dynamic; and the coefficient of friction between all sliding surfaces is a constant.

The force F is the force generated by the driver during an impact with the steering wheel. F cos is the component of F that acts parallel to the a longitudinal, or center, axis of the first steering column member. F sin is the component of F that acts transverse to the a longitudinal, or center, axis of the first steering column member.

In the exemplary embodiment of the invention, the reaction force $R_1$ is disposed at a centerline of a capsule that releasibly associates the first and second steering column with respect to one another. A distance a extends between the centerline of the capsule to a rim of a steering wheel. A distance b-x corresponds to the degree of collapse of the steering column. When x=0, the first steering column member has not begun to collapse.

At least one difference between the off-center impact and the analysis where the force is located along the center of the steering shaft is a distance c in the free body diagram. This distance c creates moments and reactions forces $R_1$ and $R_2$. The reaction forces $R_1$ and $R_2$ affect the frictional forces $\mu R_1$ and $\mu R_2$ during collapse.

When x=0 and forces in the Y-direction and moments are summed about a point proximate to reaction force $R_2$:

$$\Sigma F_y = 0 = R_2 + F \sin\theta - R_1 \qquad \text{Equation 1}$$

$$\Sigma M_2 = 0 = (b-x)R_1 + cF\cos\theta - (b-x+a)F\sin\theta \qquad \text{Equation 2}$$

Using the force and moment equations 1 and 2, it is possible to solve for the reaction forces $R_1$ and $R_2$:

$$0 = (b-x)R_1 + cF\cos\theta - (b-x+a)F\sin\theta$$
$$-(b-x)R_1 = cF\cos\theta - (b-x+a)F\sin\theta$$

$$\Rightarrow R_1 = \frac{(b-x+a)F\sin\theta - cF\cos\theta}{(b-x)} \qquad \text{Equation 4}$$

$$0 = R_2 + F\sin\theta - R_1 \qquad \text{Equation 5}$$
$$R_2 = R_1 - F\sin\theta$$

$$\Rightarrow R_2 = \frac{(b-x+a)F\sin\theta - cF\cos\theta}{(b-x)} - F\sin\theta \qquad \text{Equation 6}$$

To simplify the equations 4 and 6 for the reaction forces $R_1$ and $R_2$, it is necessary to distribute the denominator. This will help to combine like terms later in the calculation:

$$\Rightarrow R_1 = \frac{(b-x+a)F\sin\theta}{(b-x)} - \frac{cF\cos\theta}{(b-x)} \qquad \text{Equation 7}$$

$$\Rightarrow R_2 = \frac{(b-x+a)F\sin\theta}{(b-x)} - \frac{cF\cos\theta}{(b-x)} - F\sin\theta \qquad \text{Equation 8}$$

The forces in the X-direction are considered to determine the equation for the force $F_S(x)$ acting on the driver during a crash event. Absolute values are used on the friction forces because the off-center geometry in certain cases allows for a friction force in the same direction as the driver force F:

$$\Sigma F_x = 0 = F_s(x) + |\mu R_1| + |\mu R_2| - F\cos\theta \qquad \text{Equation 9}$$

The reaction forces $R_1$ and $R_2$ can be replaced in equation 9 with equations 7 and 8:

$$0 = \left| \frac{\mu(b-x+a)F\sin\theta}{(b-x)} - \frac{\mu cF\cos\theta}{(b-x)} \right| + \qquad \text{Equation 10}$$
$$\left| \frac{\mu(b-x+a)F\sin\theta}{(b-x)} - \frac{\mu cF\cos\theta}{(b-x)} - \mu F\sin\theta \right| -$$
$$F\cos\theta + F_s(x)$$

$$0 = \mu F \left| \frac{(b-x+a)\sin\theta}{(b-x)} - \frac{(c)\cos\theta}{(b-x)} \right| +$$
$$\mu F \left| \frac{(b-x+a)\sin\theta}{(b-x)} - \frac{(c)\cos\theta}{(b-x)} - \sin\theta \right| - F\cos\theta + F_s(x)$$

$$0 = F\left[ \mu \left| \frac{(b-x+a)\sin\theta - (c)\cos\theta}{(b-x)} \right| + \right.$$
$$\left. \mu \left| \frac{(b-x+a)\sin\theta - (c)\cos\theta}{(b-x)} - \sin\theta \right| - \cos\theta \right] + F_s(x)$$

To simplify equation 10, the common term present in both absolute values will be defined as Z:

$$Z = \frac{(b-x+a)\sin\theta - (c)\cos\theta}{(b-x)} \qquad \text{Equation 11}$$

Therefore, the force $F_S(x)$ on the driver can be solved by the following equation:

$$0 = F[\mu|Z| + \mu|Z - \sin\theta| - \cos\theta] + F_s(x) \qquad \text{Equation 12}$$
$$F[\mu|Z| + \mu|Z - \sin\theta| - \cos\theta] = -F_s(x)$$

$$\Rightarrow F(\theta, x) = \frac{-F_s(x)}{[\mu|Z| + \mu|Z - \sin\theta| - \cos\theta]} \qquad \text{Equation 13}$$

After analyzing the equations, it can be determined that the off-center impact reveals many characteristics that are different with respect to a center impact. One difference is that the final equation 13 has a different format than center impacts. The absolute values that are necessary in the off-center impact restrict the equation from being simplified to the degree of center impact equations. This means that the denominator of the final equation is more complex because there are multiple sin and cos terms. Another difference is that the strap force located in the numerator is negative, rather than positive.

Figure 3:
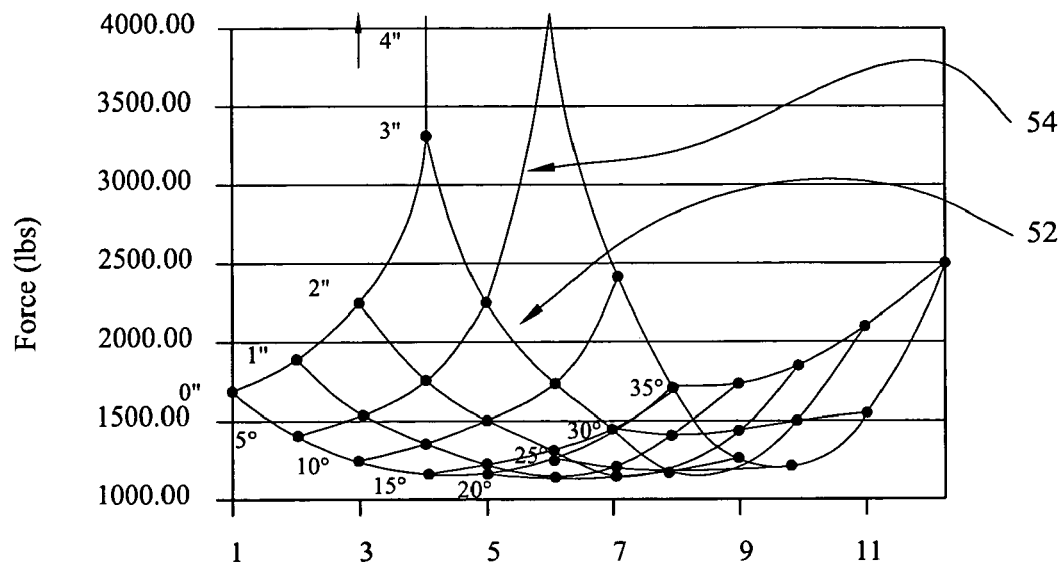
FIG. 3 is a graph showing a carpet plot of the forces acting against collapse of the steering column based on the extension and pivot angle of the first steering column member and also based on off-center impact.
Figure 4:
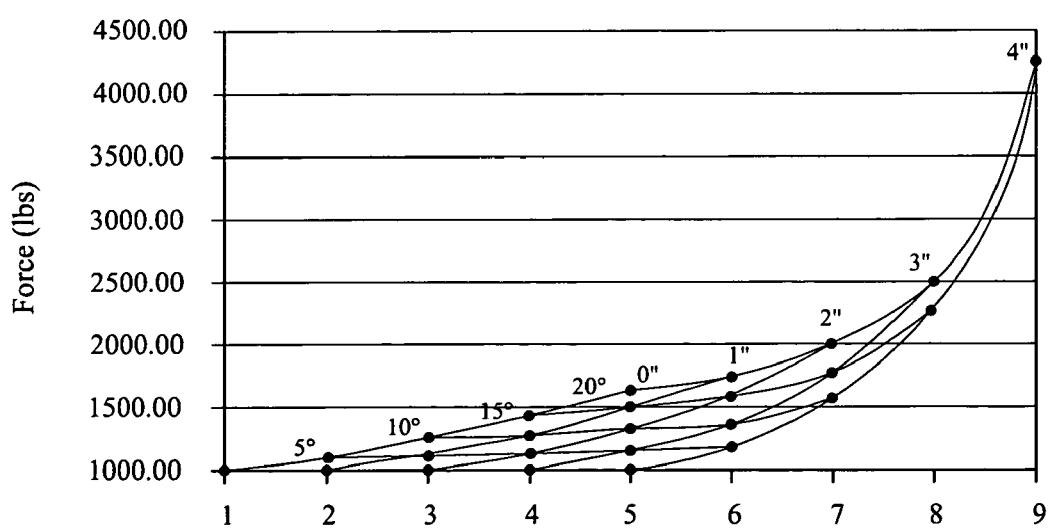
FIG. 4 is a graph showing a carpet plot of the forces acting against collapse of the steering column based on the extension and pivot angle of the first steering column member and also based on centered impact.

Referring now additionally to FIGS. 3 and 4, another tool to help demonstrate the difference between the usual centerline impact and the off-center impact is a carpet plots of the equations associated with center and off-center impacts.

Carpet plots do not use the traditional X and Y axis format. The X-axis is not used when reading a carpet plot. The data series that arise from the X-axis are the force vs. angle series for different stroke lengths. These data series' are generally convex with respect to the Y-axis in the exemplary graph. The intersecting lines with the preceding data series are force vs. stroke length series for multiple column in-car angles. These intersecting lines are generally concave with respect to the Y-axis in the exemplary graph.

In one example, assume it is desired to find the force $F_S(x)$ acting on the driver during collapse when the first steering column member 12 is at a position along the pivot path 22 corresponding to an in-car tilt angle of 10° and at a position along the extension path 14 corresponding to 3" into the collapse stroke. The graph of FIG. 3 shows a data series 52 associated with a distance of 3" into the collapse stroke. The graph of FIG. 3 also shows an intersecting line 54 associated with an in-car tilt angle of 10°. The point of intersection of the data series 52 and intersection line 54 can be traced back to the Y-axis in parallel to the X-axis to determine the force $F_S(x)$ acting on the first steering column member. In this example, the force would be approximately 2250 lbs.

A carpet plot can be used to determine substantially accurate numerical values and also to provide an overall view of the performance and trends of a steering column. For example, the observer can conclude a number of things just by looking at the carpet plot. First, it can be seen that the force on the driver decreases as the angle increases in this environment. Other environments, such as differently configured steering columns, could produce different results. Second, the force first decreases as the steering column strokes at any particular angle. Because these trends are so evident on a carpet plot, it is an efficient way to compare the performance of different steering column designs.

Referring now additionally to FIG. 4, the two carpet plots displayed look considerably different despite the fact that they use the same dimensions. The graph of FIG. 3 shows performance when the impacting force is offset with longitudinal axis of the first steering column member and the graph of FIG. 3 shows performance when the impacting force is aligned with longitudinal axis of the first steering column member. The differences are due, at least in part, to the impact location being at the bottom of the steering wheel. One reason why the forces at higher angles can be less than those found on center is because the moment caused by the location of the load on the steering wheel offsets the cantilever effect. The cantilever effect produces large friction forces on interfacing parts that move during collapse. Reducing these forces would cause a corresponding reduction in the overall force on the driver, which is displayed in both the equations and carpet plots displayed previously in this section.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   first and second steering column members, wherein said first steering column member being disposed for axial movement along an extension path between an extended position and a retracted position relative to said second steering column member and for pivoting movement along a pivot path between a tilt-up position and a tilt-down position;
   a first device operable to absorb energy associated with relative movement between said first and second steering column members along said extension path at a first rate; and
   a second device operable to adjust said first rate of energy absorbed by the first device in response to at least one of a position of said first steering column member along said extension path and a position of said first steering column member along said pivot path.

2. The apparatus of claim 1 wherein said second device includes at least one sensor operable to sense at least one of said position of said first steering column member along said extension path and said position of said first steering column member along said pivot path.

3. The apparatus of claim 2 wherein said second device includes a controller communicating with said at least one sensor.

4. A method comprising the steps of:
   disposing a first steering column member for axial movement along an extension path between an extended position and a retracted position relative to a second steering column member and for pivoting movement along a pivot path between a tilt-up position and a tilt-down position;
   absorbing energy associated with relative movement between first and second steering column members along the extension path at a first rate with a first device; and
   adjusting the first rate of energy absorbed during said absorbing step in response to at least one of a position of the first steering column member along the extension path and a position of the first steering column member along the pivot path with a second device.

5. The method of claim 4 including the step of:
   sensing at least one of the position of the first steering column member along the extension path and the position of the first steering column member along the pivot path.

6. The method of claim 5 including the step of:
   controlling the adjustment of the first rate of energy absorbed during said adjusting step in response to the at least one position sensed during said sensing step with a controller.

7. The method of claim 6 wherein said adjusting step is further defined as adjusting the first rate of energy absorbed during said absorbing step in response to both of the position of the first steering column member along the extension path and the position of the first steering column member along the pivot path.

8. The method of claim 7 wherein said sensing step is further defined as sensing both the position of the first steering column member along the extension path and the position of the first steering column member along the pivot path.

9. The method of claim 8 wherein said controlling step is further defined as controlling the adjustment of the first rate of energy absorbed during said adjusting step in response to both of the positions sensed during said sensing step with the controller.

10. The method of claim 9 wherein said adjusting step is further defined as increasing the first rate of energy absorbed.

11. The method of claim 9 wherein said adjusting step is further defined as decreasing the first rate of energy absorbed.

* * * * *